No. 715,947. Patented Dec. 16, 1902.
J. L. BERGH.
FROTH CONDENSER FOR CENTRIFUGAL MACHINES.
(Application filed Apr. 26, 1900. Renewed May 19, 1902.)
(No Model.)

Witnesses
Jos. H. Blackwood
Albert B. Blackwood.

Inventor
Jefferson L. Bergh
by W. H. Singleton
Attorneys

UNITED STATES PATENT OFFICE.

JEFFERSON L. BERGH, OF NEW YORK, N. Y., ASSIGNOR TO THE BERGH CLARIFIED MILK COMPANY, OF NEW YORK, N. Y., A CORPORATION OF NEW YORK.

FROTH-CONDENSER FOR CENTRIFUGAL MACHINES.

SPECIFICATION forming part of Letters Patent No. 715,947, dated December 16, 1902.

Application filed April 26, 1900. Renewed May 19, 1902. Serial No. 108,050. (No model.)

*To all whom it may concern:*

Be it known that I, JEFFERSON L. BERGH, a citizen of the United States, residing at 477 Fourth avenue, New York city, in the county of New York and State of New York, have invented new and useful Improvements in Froth-Condensers for Centrifugal Machines, of which the following is a specification.

My invention relates to centrifugal machines, and has for its object to provide means for condensing the froth produced in those machines in which centrifugal action is employed in treating the liquid—such as clarifying milk.

In the use of a centrifugal machine for separating cream from milk or for clarifying milk the rapid rotation of the liquid produces a froth which contains a large amount of milk. In the operation of clarifying milk, especially where the milk and cream are kept mixed, this froth quickly forms in large quantities. It is impossible to bottle or draw off the milk in cans when in this condition of froth, and since in every forty quarts of milk subjected to the centrifugal action there will be about three quarts of froth it is necessary in order to avoid great loss to condense the froth before bottling or drawing off the milk in cans. It is not practicable to permit the milk to stand and settle, as with such a course the condensation of a large quantity of milk would take several days, while it is necessary that the milk be bottled or canned on the same day that it is obtained, and, moreover, in the process of settling there would be serious loss from evaporation.

My invention aims to condense the froth during the operation of clarification or separation and to produce milk entirely free from all froth at the end of such operation, so that it may be immediately drawn off into bottles or cans.

To these ends it consists of the parts and combinations of parts hereinafter described and claimed.

My invention is illustrated in the accompanying drawings, in which—

Figure 1:
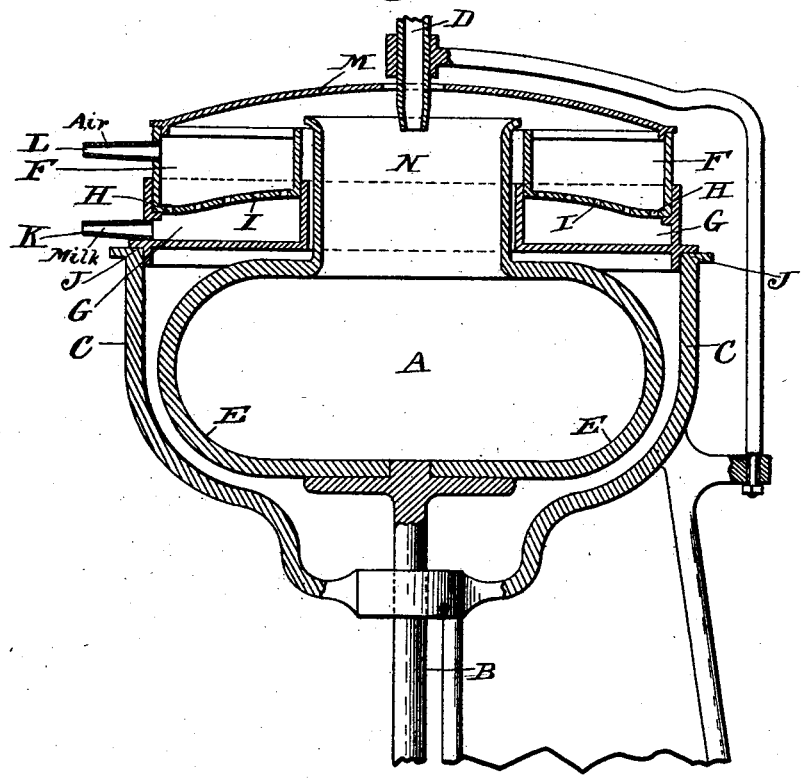
Figure 2:
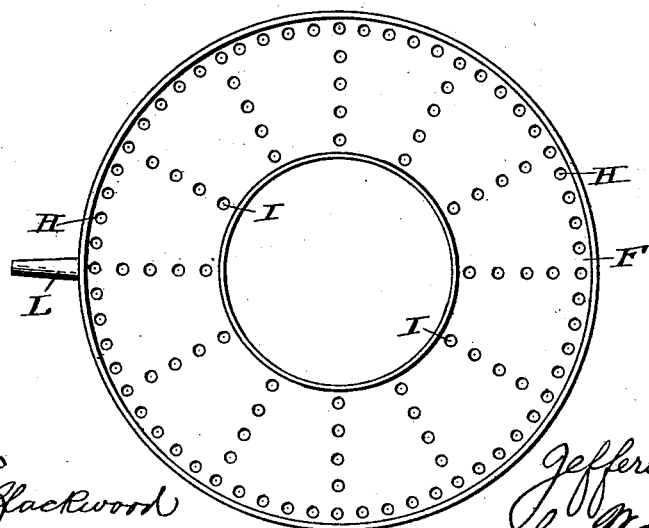

Figure 1 is a vertical central section, partly in elevation, of a centrifugal machine with my invention applied thereto; and Fig. 2, a detail plan view of the condenser vessel.

Referring to the drawings, A is the bowl of the centrifugal machine and it is driven by the shaft B. The shaft is mounted in and the bowl inclosed by the shell C. The bowl is adapted to be rotated rapidly, and the milk, which has been introduced therein through the inlet-pipe D, is driven by the centrifugal force of the rotating bowl against the sides of the latter. The bowl is preferably elliptical in cross-section and the dirt and refuse being driven out of the milk by the centrifugal action of the bowl will lodge and catch in the lower curved edges thereof at E.

F is the condenser vessel. It is mounted within an annular receptacle G upon an inner annular flange thereof. The annular condenser vessel F is provided with a bottom that slopes from the center to the sides. Around the outer edge of the vessel and in the bottom thereof are perforations H, and similar perforations I run from the center to the edge of the vessel at suitable intervals. The receptacle G is provided with an annular flange, which is supported upon the shoulder J of a suitable standard.

Leading from the receptacle G is a milk-exit pipe K and from the condenser-chamber an air-exit pipe L. On the condenser vessel is placed a cover M, provided with a central perforation through which the inlet-pipe extends. The milk will be carried around and upward by the rotating bowl, and after being cleansed by the centrifugal action will be carried up through the neck N and over the edge thereof into the condenser vessel, where the froth bubbles generated by the centrifugal action of the bowl will be broken by contact with the sides, perforated bottom, and the cover of the condenser. The air in the bubbles will escape through the air-exit pipe leading from the condenser vessel, while the milk will pass through the perforations into the receptacle below, from whence it is drawn off into bottles or cans through the exit-pipe K.

The perforated condenser vessel and the milk-receptacle are preferably made in separate parts and removable from the standard for convenience in manufacture and removal for cleaning; but these parts may be made integral and secured to the standard, in either case forming two compartments, one for condensing the froth and the other for receiving the milk condensed therefrom.

It is obvious that various changes in the details of construction may be made without departing from the spirit of my invention.

What I claim is—

1. A liquid-clarifier comprising a rotating bowl provided with a neck, a liquid-supply pipe leading to said bowl, an annular condensing vessel surrounding said neck at the upper part thereof and adapted to separate the froth from the milk, and an annular receiver underneath said condensing vessel, substantially as described.

2. In an apparatus for treating liquid by centrifugal action the combination with a rotary bowl provided with a supply and an exit portion, a condensing vessel outside of said exit portion adapted to break up and condense the froth from the liquid, and a receiver underneath said condensing vessel, substantially as described.

3. In an apparatus for treating liquid by centrifugal action, in combination with a rotary bowl, a liquid-supply pipe leading to said bowl, a froth-condensing vessel consisting of a perforated vessel outside of said bowl provided with an air-exit leading from the vessel, and a receiving-receptacle below said condensing vessel, substantially as described.

4. In a centrifugal machine, in combination with a rotating bowl, a liquid-supply pipe leading to said bowl, said bowl provided with a neck, an annular vessel surrounding said neck at the upper part thereof, said vessel provided with a perforated bottom, an air-pipe leading from said vessel, a liquid-receptacle below said perforated vessel and a liquid-exit pipe leading from said receptacle, substantially as described.

In testimony whereof I affix my signature in presence of two witnesses.

JEFFERSON L. BERGH.

Witnesses:
CHARLES F. HOLM,
LUER IMMEN.